United States Patent

[11] 3,542,459

[72] Inventor Evert P. Lindstrom
 20835 Martha St., Woodland Hills,
 California 91364
[21] Appl. No. 832,399
[22] Filed June 11, 1969
[45] Patented Nov. 24, 1970

[54] SAFETY ATTACHMENT MEANS FOR SPECTACLE LENSES
 7 Claims, 5 Drawing Figs.
[52] U.S. Cl.................................................. 351/47, 351/41
[51] Int. Cl..................................................... G02c 9/00
[50] Field of Search............................................ 351/47, 48, 57, 58, 60, 90, 91, 92, 93, 95, 154; 2/14, 13

[56] References Cited
 UNITED STATES PATENTS
 3,023,418 3/1962 Hammond................... 351/47X
 3,147,489 9/1964 Nelson.......................... 351/47X Primary Examiner—David Schonberg
Assistant Examiner—Robert L. Sherman
Attorney—Fulwider, Patton, Rieber, Lee & Utecht ABSTRACT: Safety attachment means for spectacle lenses and comprising two pairs of transparent, frame mounted safety shields, a pair for each of the lenses, with the safety shields overlying the front and rear surfaces of the lenses to protect the wearer's eyes from accidental shattering of the lenses. The shields are removably fitted into their frames for rapid replacement, the frames are resiliently biased toward one another for detachably clamping onto the spectacles, and the frames are held together by a transverse yoke which permits the frames to be adjusted transversely to fit different sizes of spectacles.

Patented Nov. 24, 1970
3,542,459
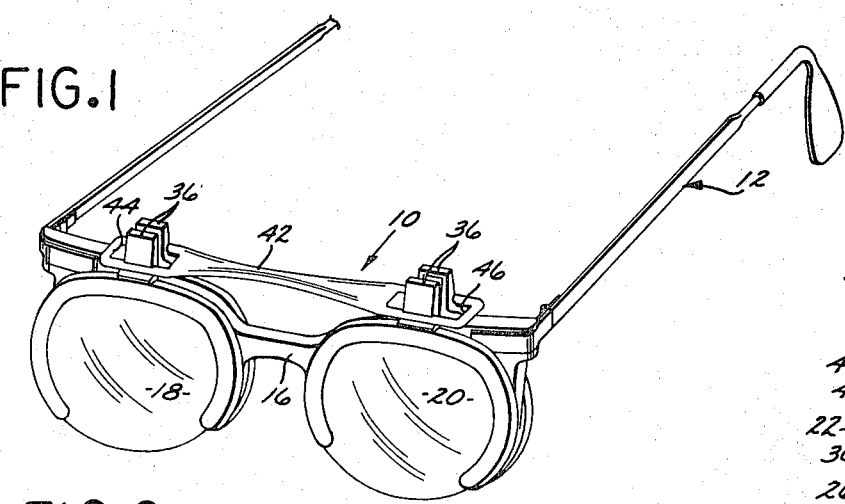
FIG.1
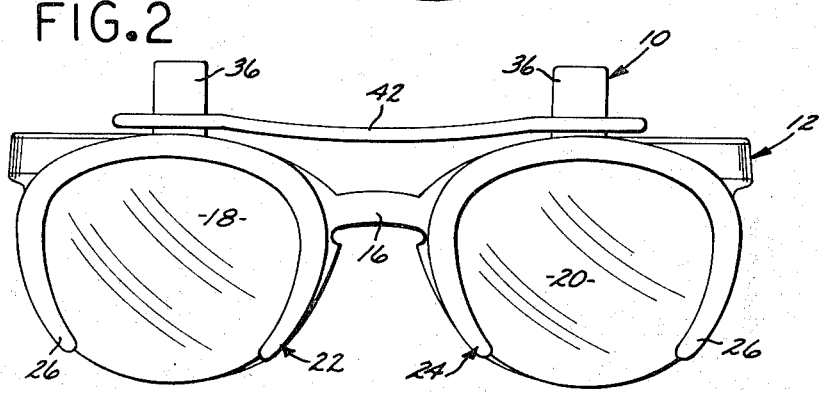
FIG.2
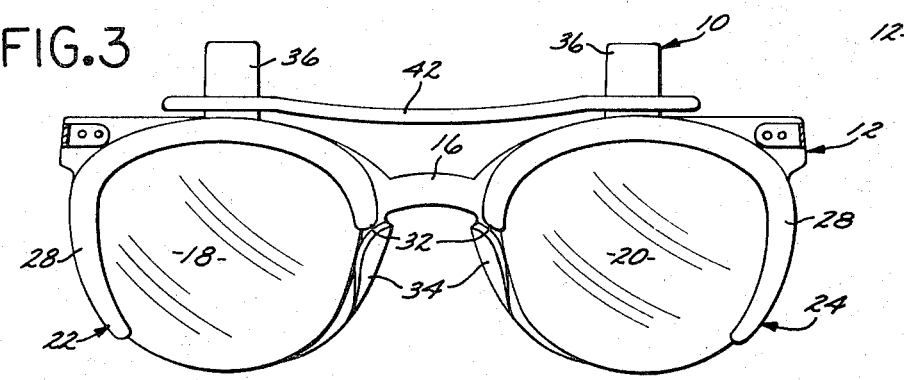
FIG.3
FIG.5
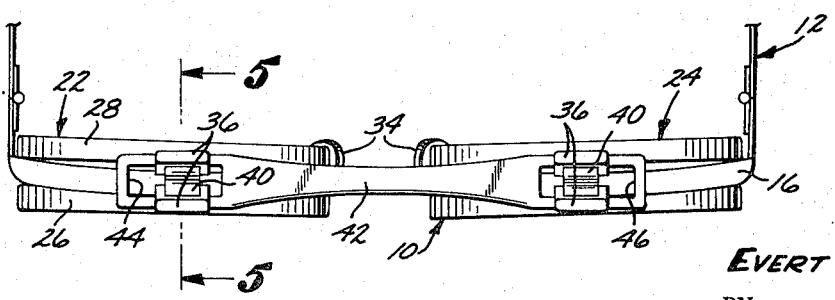
FIG.4
INVENTOR.
EVERT P. LINDSTROM
BY Fulwider, Patton, Rieber,
Lee and Utrecht
ATTORNEYS

SAFETY ATTACHMENT MEANS FOR SPECTACLE LENSES

BACKGROUND OF THE INVENTION

1. Field of the Invention

The invention relates generally to safety glasses and to safety attachments for conventional spectacles to provide such spectacles with certain of the features of safety glasses.

2. Description of the Prior Art

The preparation of safety glasses having lenses ground to a particular optical prescription requires a certain period of time during which a person such as a new employee in a factory must find some temporary means for protecting his eyes.

Presently there are clip-on devices which include nonprescription lenses or shields which fit over the front surface of the workers's conventional spectacles. These devices work reasonably well except in those instances where there is a sudden or sharp impact against the protective shield by a relatively heavy or fast moving object. such an impact may not break the protective shield, but the prescription glass lens behind it is usually shattered and the fragments and shards of glass cause serious eye injuries.

In addition to the lack of adequate protection for workers and others who are awaiting delivery of prescription safety glasses, there is a corresponding lack of satisfactory safety attachments for persons who prefer some form of attachment for their usual eyeglasses or spectacles rather than going to the expense of obtaining prescription safety glasses.

SUMMARY

According to the present invention, safety attachments means are provided which protect the user from accidental shattering of the spectacles to which the attachment means is mounted. This is accomplished by two pairs of protective or safety shields which fit over the front and rear surfaces of the spectacle lenses, and which are resiliently biased toward one another so that the attachment means is securely held in position but it is also quickly demountable. The attachment means preferably includes a connecting yoke extending between the two pairs of shields to connect them together, and characterized by elongated slots or openings to enable the pairs of shields to be moved toward or away from one another for adjustment to various sizes and types of spectacles.

The safety attachment means thus can convert any pair of glasses or spectacles into safety glasses by providing safety shields both in front and in back of the regular lenses. Heavy impact may still shatter the lenses but none of the glass particles will get into the wearer's eyes. Moreover, the attachment means is adjustable to different spectacles, and is capable of quickly accepting and mounting replacement shields.

Other objects and features of the invention will become apparent from consideration of the following description taken in connection with the accompanying drawing.

BRIEF DESCRIPTION OF THE DRAWINGS

FIG. 1 is a perspective view of a safety attachment means according to the present invention, the attachment means being illustrated in mounted position upon a pair of conventional spectacles;

FIG. 2 is an enlarged front elevational view of the assembly of FIG. 1;

FIG. 3 is an enlarged rear elevational view of the assembly of FIG. 1;

FIG. 4 is an enlarged top plan view of the assembly of FIG. 1; and

FIG. 5 is an enlarged view taken along the line 4-4 of FIG. 4.

DESCRIPTION OF THE PREFERRED EMBODIMENT

Referring now to the drawing, there is illustrated a safety attachment means 10 mounted to a usual and conventional pair of eye glasses or spectacles 12. The spectacles 12 include a pair of prescription lenses, one of which is illustrated at 14 in FIG. 5, the spectacle lenses being mounted in a conventional frame 16.

The present safety attachment means 10 provides protection against impact shattering of the spectacle lenses. For this purpose, the attachment means 10 includes a first pair of transparent, impact resistant safety shields 18 which are adapted to overlie in coextensive relation the front and rear surfaces, respectively of the lens 14 of the spectacles 12, as best illustrated in FIG. 5. In addition, the attachment means 10 includes an identical second pair of transparent, impact resistant safety shields 20 which are adapted to overlie in coextensive relation the front and rear surfaces, Respectively, of the other of the lenses of the spectacles 12.

The safety shields 18 may be made of any impact or shatter resistant material, such as any of a variety of well-known plastic materials presently on the market, and are preferably configured to completely cover the adjacent surface of the associated spectacle lens. The shields 18 and 20 may be tinted to provide protection against sunlight and other bright light sources, as well be apparent.

The attachment means 10 also includes a frame assembly 22 which mounts the pair of safety shields 18, and a frame assembly 24 which mounts the safety shield 20. The assemblies 22 and 24 are identical, and the description which will next be made of the assembly 22 applies equally to the assembly 24.

More particularly the frame assembly 22, as best seen in FIG. 5, comprises a pair of frames 26 and 28, each of which is arcuate in configuration, but discontinuous at the bottom. The free ends of the rim adjacent the discontinuity or opening in the rim are spaced apart a distance less than the width of the safety shield 18 which fits therewithin. The frames 26 and 28 are preferably made of molded plastic material, and of a particular material which is sufficiently resilient that the free ends of the rim of the frame can be urged apart to insert the safety shield 18. The resilience of the plastic material then effects clamping engagement of the inserted safety shield by the inner margin of the central opening defined by the frame rim. Preferably the frame rims are each provided with a peripheral slot or channel 30 for seating and orienting the peripheral edge of the associated one of the safety shields 18.

With particular reference to FIG. 3, it is noted that the portion of the rims of the frames 28 are preferably cut away, as indicated at 32 where it is necessary to provide clearance for the usual nose-engaging sections 34 of the spectacles 12.

With this arrangement, each of the frames 26 and 28 is adapted to quickly receive a replacement safety shield simply by biasing or urging the free ends of the frame rim apart, the resilience of the frame material being sufficient in the absence of such urging to securely clamp the safety shield in position.

Each of the frames 26 and 28 of the frame assembly 22 include an integral, upwardly projecting squeeze tab 36, the tabs 36 of each pair of frames 26 and 28 being arranged in opposed or confronting relation, as best viewed in FIG. 5. Each squeeze tab includes a molded-in cavity or seat 38, and the confronting seats 38 of the associated pair of frames 26 and 28 each receive an opposite extremity of an elongated, reversely formed bias element or spring 40. The spring 40 is made of suitable resilient material, such as spring steel, and is compressed between the confronting frames 26 and 28, exerting its bias to urge the upper portions of the frames 26 and 28 apart so as to thereby urge the portions of the frames below the squeeze tabs 36 against the spectacle frame 16 as best seen in FIG. 5. Thus, the bias of the spring 40 normally maintains the respective frame assemblies 22 and 24 in position upon the pair of lenses of the spectacles 12. By squeezing the tabs 36 toward one another against the bias of the spring 40, the assemblies 22 and 24 may be moved upwardly and out of engagement with the spectacles 12.

The attachment means 10 also preferably includes a transverse yoke 42 which extends between the assemblies 22 and 24. The yoke 42 includes a pair of elongated slots or openings 44 and 46 for receiving the pairs of tabs 36 of the assembly 22 and the pair of tabs 36 of the assembly 24, respectively. As best seen in FIG. 5, the margins of the openings 44 and 46 engage grooves 48 formed in the tabs 36 for maintaining the associated tabs and to maintain them in assembled relation.

At least one, and preferably both, of the openings 44 and 46 is transversely elongated so as to enable transverse slideable movement therein of the associated pair of squeeze tabs 36. Such transverse movement enables adjustment of the position of the frame assemblies 22 and 24 relative to the spectacle lenses of different sizes and types of spectacles 12.

From the foregoing it will be apparent that the present safety attachments means 10 can be quickly mounted and demounted from ordinary glasses or spectacles, and the double safety shields protect the wearer's eyes from any impact shattering of the spectacle lenses. Moreover, the safety shields may be quickly replaced, if required, and the attachment means is adjustable to permit mounting to a variety of different sizes and types of spectacles.

Various modifications and changes may be made with regard to the foregoing detailed description without departing from the spirit of the invention.

I claim:

1. Safety attachment means for spectacle lenses, said attachment means comprising: a first pair of transparent, impact resistant safety shields adapted to overlie in coextensive relation the front and rear surfaces, respectively, of one of the lenses of a pair of spectacles; a second pair of transparent, impact resistant safety shields adapted to overlie in coextensive relation the front and rear surfaces, respectively, of the other of the lenses of a pair of spectacles; a first frame means mounting said first pair of safety shields and including bias means tending to urge said first pair of safety shields toward one another for demountably clamping said first frame means onto the spectacles; and a second frame means mounting said second pair of safety shields and including bias means tending to urge said second pair of safety shields toward one another for demountably clamping said second frame means onto the spectacles.

2. Safety attachments means according to claim 1 wherein each of said frame means comprises a pair of frame having arcuate rims which are each discontinuous and made of resilient material whereby the free ends thereof may be urged apart for receipt of one of said safety shields within said arcuate rim, the resilience of said material of said arcuate rim effecting clamping engagement between said arcuate rim and said one of said safety shields.

3. Safety attachment means according to claim 2 wherein each of said arcuate rims includes a channel in its inner periphery, said channel receiving the peripheral edge of the associate said safety shield to orient and maintain the same position upon said arcuate rim.

4. Safety attachment means according to claim 1 wherein each of said frame means comprises a pair of frames for mounting the associated said pair of safety shields, each said pair of frames including opposed squeeze tabs at the upper portions thereof said squeeze tabs being configured to move the lower portions of said pair of frames apart upon movement of said squeeze tabs toward one another whereby a user may quickly demount said pair of frames from the spectacles by squeezing said opposed squeeze tabs together against the bias of the associated said bias means.

5. Safety attachment means according to claim 1 and including a transverse yoke extending between said first and second frame means said yoke and at least one of said first and second frame means including means affording transverse movement of at least one of said first and second frame means relative to said yoke whereby said first and second pairs of safety shields may be transversely adjusted in position relative to the lenses of said spectacles.

6. Safety attachment means according to claim 4 including a transverse yoke extending between said first and second frame means and including an opening at each of its opposite extremities, each said opening receiving a pair of said squeeze tabs, the margin of said opening engaging the associated said squeeze tabs and maintaining them in assembled relation.

7. Safety attachment means according to claim 6 wherein each said opening is transversely elongated to afford transverse slideable movement therein of the associated said pair of squeeze tabs whereby said first and second safety pairs of shields may be transversely adjusted in position relative to the lenses of said spectacles.

PO-1050
(5/69)

UNITED STATES PATENT OFFICE
CERTIFICATE OF CORRECTION

Patent No. 3,542,459      Dated November 24, 1970

Inventor(s) Evert P. Lindstrom

It is certified that error appears in the above-identified patent and that said Letters Patent are hereby corrected as shown below:

Column 1, line 20, delete "such" and insert --Such--.
Column 2, line 14, delete "Respectively" and insert
    --respectively--.
Column 3, line 40, delete "frame" (second occurrence) and
    insert --frames--.
Column 4, line 5, delete "10".
Column 4, line 28, delete "11".
Column 4, line 38, delete "safety".
Column 4, line 38, before "shields" insert --safety--.

SIGNED AND
SEALED
MAR 2 1971

MAR. 2, 1971

(SEAL)
Attest:

Edward M. Fletcher, Jr.
Attesting Officer

WILLIAM E. SCHUYLER, JR.
Commissioner of Patents